(12) United States Patent
Jas (10) Patent No.: US 11,968,045 B2
(45) Date of Patent: *Apr. 23, 2024

(54) TELEMETRY DATA ERROR DETECTION (71) Applicant: Juniper Networks, Inc., Sunnyvale, CA (US)

(72) Inventor: Frank Jas, Scotts Valley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,911

(22) Filed: Feb. 16, 2023

(65) Prior Publication Data

US 2023/0198675 A1 Jun. 22, 2023

Related U.S. Application Data

(63) Continuation of application No. 17/808,720, filed on Jun. 24, 2022, now Pat. No. 11,616,603, which is a (Continued)

(51) Int. Cl.
*H04L 1/1607* (2023.01)
*G06F 16/23* (2019.01)
*H04L 1/00* (2006.01)

(52) U.S. Cl.
CPC ........ *H04L 1/1678* (2013.01); *G06F 16/2322* (2019.01); *G06F 16/2358* (2019.01); *H04L 1/0016* (2013.01)

(58) Field of Classification Search
CPC . H04L 1/1678; H04L 1/0016; G06F 16/2322; G06F 16/2358
(Continued)

(56) References Cited

U.S. PATENT DOCUMENTS 3,934,224 A 1/1976 Dulaney et al.
9,055,030 B2 6/2015 Field et al.
(Continued)

FOREIGN PATENT DOCUMENTS

CN 102323941 B 12/2012
CN 105302861 A 2/2016
(Continued)

OTHER PUBLICATIONS

Extended European Search Report for Application No. EP19180766.8, dated Jan. 2, 2020, 8 pages.
(Continued)

*Primary Examiner* — Giovanna B Colan
(74) *Attorney, Agent, or Firm* — Harrity & Harrity, LLP (57) ABSTRACT

A device may receive a first telemetry data entry associated with an attribute and store a record associated with the first telemetry data entry, wherein the record identifies a first context value associated with the attribute. The device may log a first timestamp of the first telemetry data entry in a lookup table, wherein the lookup table includes a mapping of the attribute to the first context value and to the first timestamp. The device may receive a second telemetry data entry associated with the attribute and may determine, from the mapping, that the second telemetry data entry is associated with a second context value that is different from the first context value. The device may determine whether a second timestamp, of the second telemetry data entry, is before the first timestamp. The device may perform an action based on whether the second timestamp is before the first timestamp.

20 Claims, 7 Drawing Sheets

Related U.S. Application Data continuation of application No. 16/351,858, filed on Mar. 13, 2019, now Pat. No. 11,405,141.

(58) Field of Classification Search
USPC .............. 707/689; 709/224, 225; 726/24, 22
See application file for complete search history.

(56) References Cited

U.S. PATENT DOCUMENTS

| | | | |
|---|---|---|---|
| 9,613,147 B2 | 4/2017 | Carlson et al. | |
| 9,923,767 B2* | 3/2018 | Dickey | H04L 41/0816 |
| 10,367,827 B2* | 7/2019 | Seward | H04L 63/1425 |
| 10,379,967 B2 | 8/2019 | Wade et al. | |
| 11,405,141 B2 | 8/2022 | Jas | |
| 2007/0220140 A1* | 9/2007 | Weidenschlager | H04L 41/0681 709/224 |
| 2014/0230062 A1* | 8/2014 | Kumaran | H04L 63/1408 726/24 |
| 2015/0193454 A1 | 7/2015 | Peretz et al. | |
| 2017/0083386 A1 | 3/2017 | Wing et al. | |
| 2017/0132306 A1 | 5/2017 | Brew et al. | |
| 2017/0177046 A1 | 6/2017 | Garg et al. | |
| 2019/0294711 A1* | 9/2019 | Castro | G06F 11/1474 |
| 2022/0321267 A1 | 10/2022 | Jas | |

FOREIGN PATENT DOCUMENTS

| | | |
|---|---|---|
| CN | 107209705 A | 9/2017 |
| CN | 107967301 A | 4/2018 |

OTHER PUBLICATIONS

Extended European Search Report for Application No. EP23153329.0, dated Apr. 19, 2023, 12 pages.

* cited by examiner

TELEMETRY DATA ERROR DETECTION

RELATED APPLICATION

This application is a continuation of U.S. patent application Ser. No. 17/808,720, filed Jun. 24, 2022, which is a continuation of U.S. patent application Ser. No. 16/351,858, filed Mar. 13, 2019 (now U.S. Pat. No. 11,405,141), which are incorporated herein by reference in their entireties.

BACKGROUND

Telemetry involves recording received telemetry data to a data structure. Typically, telemetry data is received from a remote or inaccessible source and is used for monitoring and analysis. Telemetry data may be relayed using radio, infrared, ultrasonic, GSM, satellite, or cable, depending on the application.

SUMMARY

According to some implementations, a method may include receiving an event entry of an event stream, wherein the event entry is representative of an event associated with an attribute; generating, using a lookup table, an event record based on the event entry, wherein the lookup table includes a mapping of the attribute to a first context value, and wherein the event record indicates that the first context value is associated with the event; storing the event record in an event record data structure; logging, in the mapping of the lookup table, a first timestamp associated with the attribute, wherein the first timestamp is included in the event entry; receiving a context entry of a context stream, wherein the context entry indicates that the attribute is associated with a second context value that is different from the first context value; determining, based on the first context value being different from the second context value, whether a second timestamp, of the context entry, is before the first timestamp; and performing an action based on whether the second timestamp is before the first timestamp.

According to some implementations, a device may include one or more memories; and one or more processors, communicatively coupled to the one or more memories, configured to: receive an event entry of an event stream, wherein the event entry is representative of an event associated with an attribute; store an event record associated with the event in an event record data structure, wherein the event record indicates that a first context value, associated with the attribute, is associated the event, and wherein the first context value is mapped to the attribute in a lookup table when the event record is stored; log, in the lookup table, a first timestamp associated with the attribute, wherein the first timestamp is associated with the event entry; receive a context entry of a context stream, wherein the context entry indicates that the attribute is associated with a second context value that is different from the first context value; identify, based on the second context value being different from the first context value, a second timestamp associated with the context entry; determine that the second timestamp is before the first timestamp; and perform, based on determining that the second timestamp is before the first timestamp, an action associated with indicating that the event record is inaccurate.

According to some implementations, a non-transitory computer-readable medium may store one or more instructions. The one or more instructions, when executed by one or more processors of a device, may cause the one or more processors to: receive a first telemetry data entry associated with an attribute; store a record associated with the first telemetry data entry, wherein the record identifies a first context value associated with the attribute; log a first timestamp of the first telemetry data entry in a lookup table, wherein the lookup table includes a mapping of the attribute to the first context value and to the first timestamp; receive a second telemetry data entry associated with the attribute; determine, from the mapping, that the second telemetry data entry is associated with a second context value that is different from the first context value; determine whether a second timestamp, of the second telemetry data entry, is before the first timestamp; and perform an action based on whether the second timestamp is before the first timestamp.

DETAILED DESCRIPTION

The following detailed description of example implementations refers to the accompanying drawings. The same reference numbers in different drawings may identify the same or similar elements.

In many instances, telemetry data associated with events is tracked, stored, and/or reviewed to enable an entity (e.g., an individual, an organization, and/or the like) to review timing and/or information associated with the events. Such telemetry data is typically received in a plurality of streams from different sources. For example, a first stream (e.g., an event stream) may include data entries representative of events involving an attribute (e.g., as indicated by a router or gateway), while a second stream (e.g., a context stream) may include data entries representative of changes to context (e.g., an identifier, a location, a characteristic, and/or the like) of the attribute (e.g., as indicated by a domain name server (DNS)). Furthermore, some network devices may receive extremely large numbers of event entries (or other types of data entries) at a relatively rapid rate (e.g., 10,000 event entries per second, 50,000 event entries per second, 100,000 event entries per second). In order to process the event entries, a network device typically immediately stores event records associated with the data entries in a data structure. In some cases, using a lookup table, the event entries are joined with context entries (which may be received from a different source than the event entries) to include the context information associated with the event. For example, a host identifier (e.g., a media access control (MAC) address of the network device, an international mobile equipment identifier (IMEI) of the network device, and/or the like) from a context entry associated with an internet protocol (IP) address of the event may be stored in the data record to identify the network device associated with the event.

However, in some cases, context entries may be delayed relative to event entries, resulting in erroneous event records. Referring to the example above, if a context entry indicating that the IP address is no longer associated with a particular device that was involved in an event is delayed, an event record for the event may erroneously identify the wrong device is associated with the event. Previous techniques to detect such errors may involve batch processing and/or reviewing event records to detect the errors (which may occur between relatively long periods of time (e.g., a day, several days, a week, and/or the like). For an event associated with malicious activity, if an event record indicates the wrong device was involved in the event, computing resources and/or network resources can be wasted in tracking down and/or blacklisting the wrong device while permitting a malicious device to potentially continue malicious activities, which may waste additional computing and/or network resources. Furthermore, the longer the delay in detecting the record, the less likely that the record is detected and/or that a malicious device associated with the event can be identified or caught.

Some implementations described herein provide a network device that performs telemetry data error detection. For example, the network device may include a telemetry data analyzer that detects likely error records associated with telemetry data using timestamps with a lookup table used to generate the event records. For example, the telemetry data analyzer may generate and/or update a lookup table entry, for each attribute (e.g., IP address), that includes the attribute, a corresponding context of the attribute (e.g., a host identifier), and a timestamp associated with a most recent event of the attribute. In this way, if a context entry is received that includes a timestamp before the timestamp in the lookup table, the network device may determine that event records associated with the attribute may be erroneous. In this way, the network device may quickly (e.g., as soon as the context entry is received rather than after detecting the error due to one or more other prolonged processes, such as batch processing, and/or the like) and efficiently detect and/or indicate that one or more event records is erroneous to permit the event records to be addressed (e.g., flagged, erased, corrected, and/or the like). Accordingly, computing resources and/or network resources associated with analyzing and/or relying on inaccurate or erroneous event records may be conserved, as described herein.

Figure 1A:
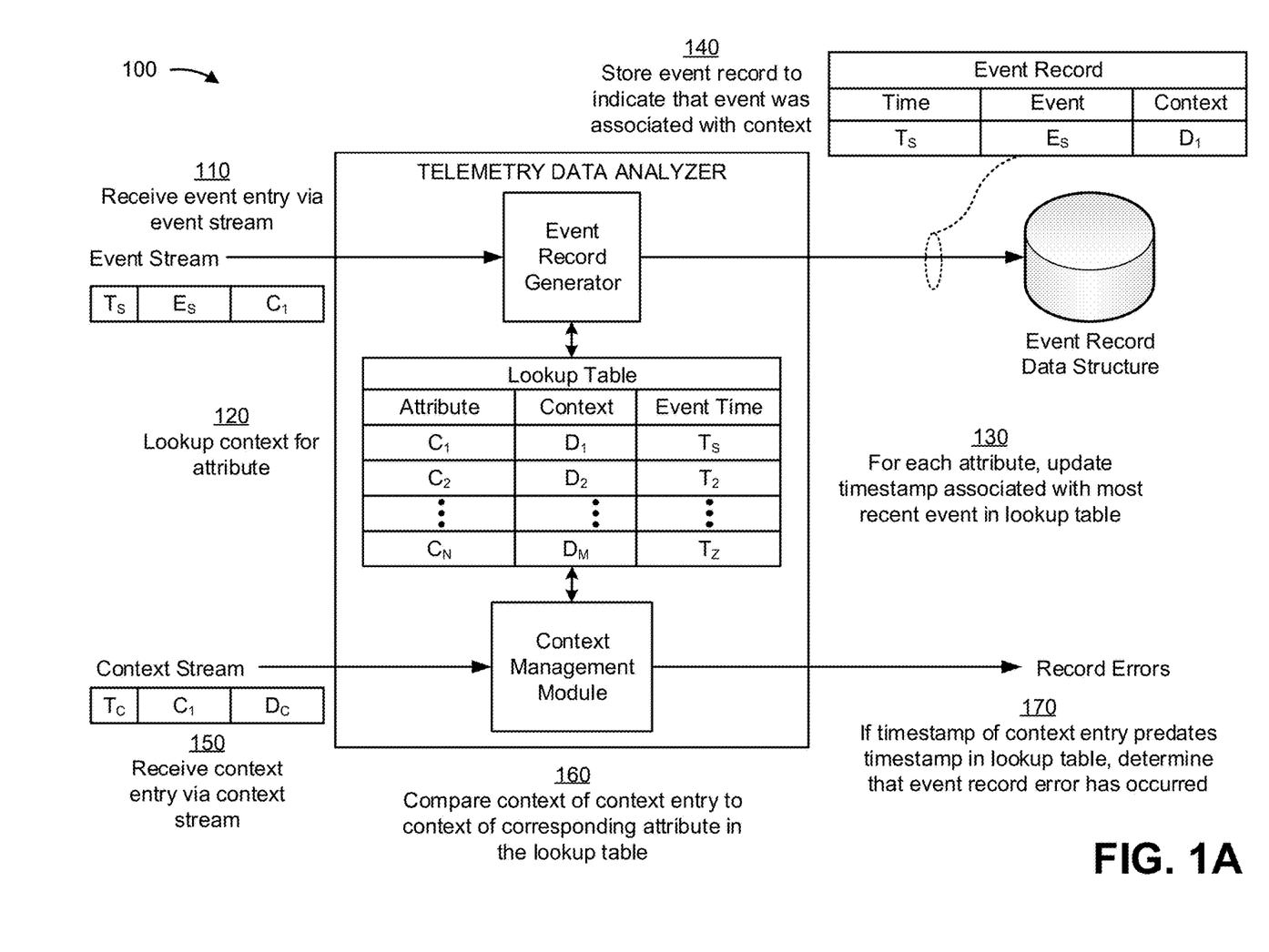
FIGS. 1A-1B are diagrams of an example implementation described herein.
Figure 1B:
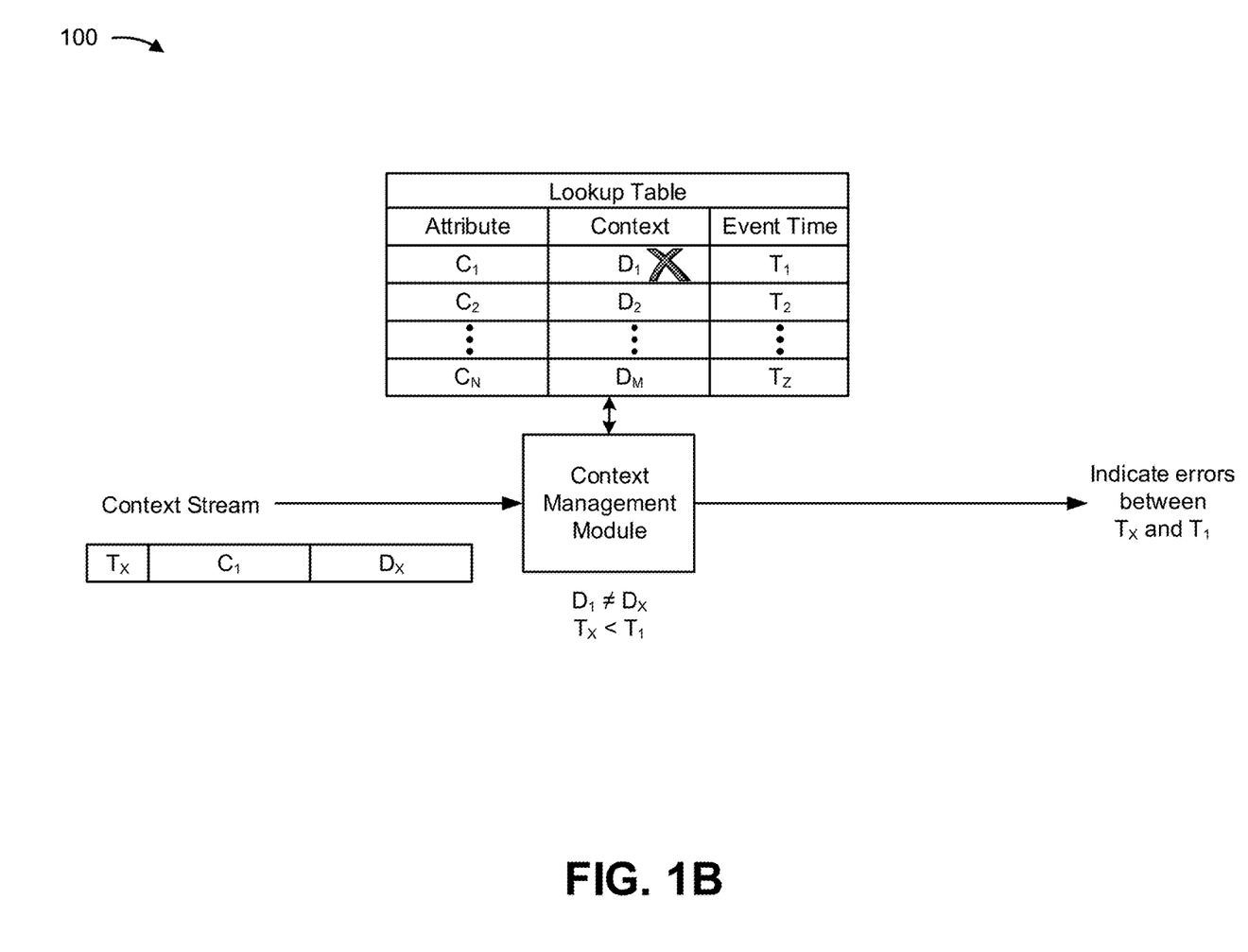

FIGS. 1A and 1B are diagrams of an example implementation 100 described herein. Example implementation 100 includes a telemetry data analyzer, an event stream, a context stream, an event record data structure, and a record error indicator. As shown, the telemetry data analyzer may include an event record generator, a lookup table, and a context management module. The telemetry data analyzer may be associated with (e.g., included within and/or configured to monitor) a network device that handles network traffic associated with a user device and/or a network.

As described herein, the telemetry data analyzer may record timestamps in the lookup table to determine whether a received context entry for an attribute is delayed relative to an event entry for the attribute. A context entry for an attribute may be considered delayed if the context entry is received after an event record for an event entry involving the attribute is recorded and/or if a timestamp of the context entry precedes a timestamp of the event entry. If the telemetry data analyzer determines that the context entry is delayed, the telemetry data analyzer may perform an action to indicate that the event record is likely erroneous.

As shown in FIG. 1A, and by reference number 110, the telemetry data analyzer receives an event entry via an event stream. The event entry may be associated with a particular event (e.g., a user device sending or receiving information via a network device associated with the telemetry data analyzer). The event entry may be one of a plurality of event entries received via the event stream. As shown, the event stream includes a timestamp of the event $T_S$, an event indicator $E_S$ for the event, and an attribute $C_1$ associated with the event. The event indicator may indicate a type of the event. The attribute may indicate a source and/or destination associated with the event. For example, the attribute may indicate an IP address associated with the event. While implementations described herein may refer to an attribute of telemetry data referring to an IP address, the attribute may refer to any other suitable type of information that may be included and/or shared across multiple telemetry data streams.

In this way, the telemetry data analyzer may receive the event entry to permit the telemetry data analyzer to generate an event record for the event based on context of the attribute in the lookup table.

As shown further shown in FIG. 1A, and by reference number 120, the telemetry data analyzer looks up the context for the attribute in the lookup table. The lookup table may be implemented and/or stored as any suitable data structure in a memory or storage device of the telemetry data analyzer (or of an associated network device). As shown, the lookup table maps attributes C to context values D. Accordingly, the telemetry data analyzer, for an event involving attribute $C_1$, may presume that the event was associated with context $D_1$. As described herein, the context from the lookup table may be joined with information from the event entry to generate an event record.

In this way, the telemetry data analyzer may determine context information associated with an event using the lookup table.

As shown further shown in FIG. 1A, and by reference number 130, the telemetry data analyzer, for each attribute, updates a timestamp entry in the lookup table with a most recent event in the lookup table. For example, for each event entry that involves a particular attribute, a timestamp from the event entry may be written to the lookup table to indicate that an event record that associates the attribute C to the context D with that timestamp was stored. More specifically, a time stamp for the event entry associated with $C_1$ may be updated to indicate time $T_S$, as shown.

In this way, the telemetry data analyzer may update the lookup table to store and/or indicate a timestamp associated with a most recent time that an attribute is associated with context information in an event record.

As shown further shown in FIG. 1A, and by reference number 140, the telemetry data analyzer, via the event record generator, stores an event record associated with the event. For example, the telemetry data analyzer may perform a join operation that joins information from the lookup table with the event entry. More specifically, the telemetry data analyzer may join the context information from the lookup table with the timestamp of the event entry and/or an event indicator of the event entry. Accordingly, as shown, for an event entry involving event indicator $E_S$ at time $T_S$ that was associated with attribute $C_1$, the event record generator may generate an event record to indicate that the event with event indicator $E_S$ occurred at time $T_S$ and involved context information $D_1$. In some implementations, the attribute $C_1$ may also be stored in the event record and/or in association with the event record.

In this way, the telemetry data analyzer may generate an event record associated with an event and/or an attribute to include context information associated with the attribute.

As shown further shown in FIG. 1A, and by reference number 150, the telemetry data analyzer receives a context entry via a context stream. The context entry may be associated with a particular context update (e.g., reassignment of context information for an attribute, such as a reassignment of an IP address from one host identifier to another host identifier). The context entry may be one of a plurality of context entries received via the context stream. In some implementations, the context stream is received from a source that is different from the source that provided the event stream. As shown, the context stream includes a timestamp $T_C$ of the context update, an attribute of $C_1$ of the context update, and context information $D_C$ of the context update. The attribute $C_1$ may correspond to or may be the same attributes or types of attributes that are in the lookup table and/or attributes that may be included in the event entries received via the event stream. The context information $D_C$ may correspond to or may be the same context information or types of context information that are in the lookup table. In some implementations, the context entry may be delayed relative to an event entry.

In this way, the telemetry data analyzer may receive a context entry associated with an attribute to permit the telemetry data analyzer to determine whether an event record associated with the attribute is erroneous.

As shown further shown in FIG. 1A, and by reference number 160, the telemetry data analyzer, via the context management module, compares context information of the context entry with context information of the corresponding attribute $C_1$ in the lookup table. If the telemetry data analyzer determines that the context information is the same (e.g., $D_C=D_1$), the telemetry data analyzer may determine that any recent event records recorded that involve the attribute likely are not erroneous. However, if the telemetry data analyzer determines that the context information is different (e.g., $D_C \neq D_1$), the telemetry data analyzer may compare the timestamp $T_C$ of the context entry to the timestamp $T_S$ in the lookup table. Furthermore, in some implementations, the telemetry data analyzer may update the lookup table with the context information that is included in the context entry.

In this way, the telemetry data analyzer may compare context information in the lookup table with context entries to determine whether the context information is to be updated and/or determine whether the event record data structure may include erroneous event records.

As shown further shown in FIG. 1A, and by reference number 170, the telemetry data analyzer, via the context management module, determines, if the timestamp of the context entry predates the timestamp in the lookup table, that an error occurred. For example, because the attributes are the same in the received event entry and the received context entry, if $T_C$ is before $T_S$, then telemetry data analyzer may determine that the context entry is delayed and that an event record in the event record data structure is likely erroneous. For example, the telemetry data analyzer may determine that the event record is likely erroneous because the timestamp of the lookup table indicates a most recent time that an event record associated with the attribute was made but the context of the attribute had changed before that. Further, in some implementations, the telemetry data analyzer may determine that any event records associated with the attribute that are made between times of the timestamps are likely erroneous. For example, the telemetry data analyzer may identify the time period between the time stamps and/or any corresponding event entries for the attribute that are in the event record data structure to indicate that the event records are likely erroneous.

In this way, the telemetry data analyzer may identify potential errors in the event record database and perform an action associated with the event record. For example, the telemetry data analyzer may send a notification to a management device to indicate that the event record data structure includes erroneous records. Additionally, or alternatively, the telemetry data analyzer may store an error record in an error record data structure. The error record data structure may be separate from the event record data structure. In some implementations, the error record data structure is stored in a separate memory or storage device from a memory or storage device of the event record data structure. According to some implementations, the telemetry data analyzer may generate an error record that identifies a time period between the timestamps to indicate that any context information (or value) that was associated with the attribute during the time period is likely inaccurate. Additionally, or alternatively, the telemetry data analyzer may append an error flag to the event record in the event record data structure to indicate that the context value of the event record is likely inaccurate.

According to some implementations, based on the erroneous record, one or more operations associated with the correct context information may be performed. For example, information associated with the event may be rerouted via a different path (e.g., a path that corresponds to a location of a user device associated with the context information). Additionally, or alternatively, the telemetry data analyzer may instruct a source associated with the event entry to resubmit or resend network traffic associated with the event. In some implementations, the telemetry data analyzer may block network traffic from the source associated with the event and/or prevent the source from sending network traffic. Additionally, or alternatively, the telemetry data analyzer may cause a network device (e.g., a network device associated with the telemetry data analyzer) to drop network traffic associated with the event.

As shown in FIG. 1B, the context management module performs an example analysis in association with example implementation 100. For example, as shown, the context management module may determine that a context stream with timestamp $T_X$, attribute $C_1$, and context $D_X$ is delayed (i.e., $T_X < T_1$) and that the context information $D_X$ is different from the context information for the attribute in the lookup table (i.e., $D_1 \neq D_X$). Therefore, the context management module may indicate that event records associated with times between $T_X$ and $T_1$ are likely erroneous and/or inaccurate.

Accordingly, the telemetry data analyzer of example implementation 100 may utilize a timestamp system and/or lookup table to detect erroneous event records. Using timestamps associated with event entries and timestamps of delayed context entries, the telemetry data analyzer may be able to detect than an event record likely includes incorrect context information. Accordingly, computing resources and/or network resources associated with detecting, addressing, and/or mitigating such errors can be conserved using the telemetry data analyzer as described herein.

As indicated above, FIGS. 1A-1B are provided merely as one or more examples. Other examples may differ from what is described with regard to FIGS. 1A-1B.

Figure 2:
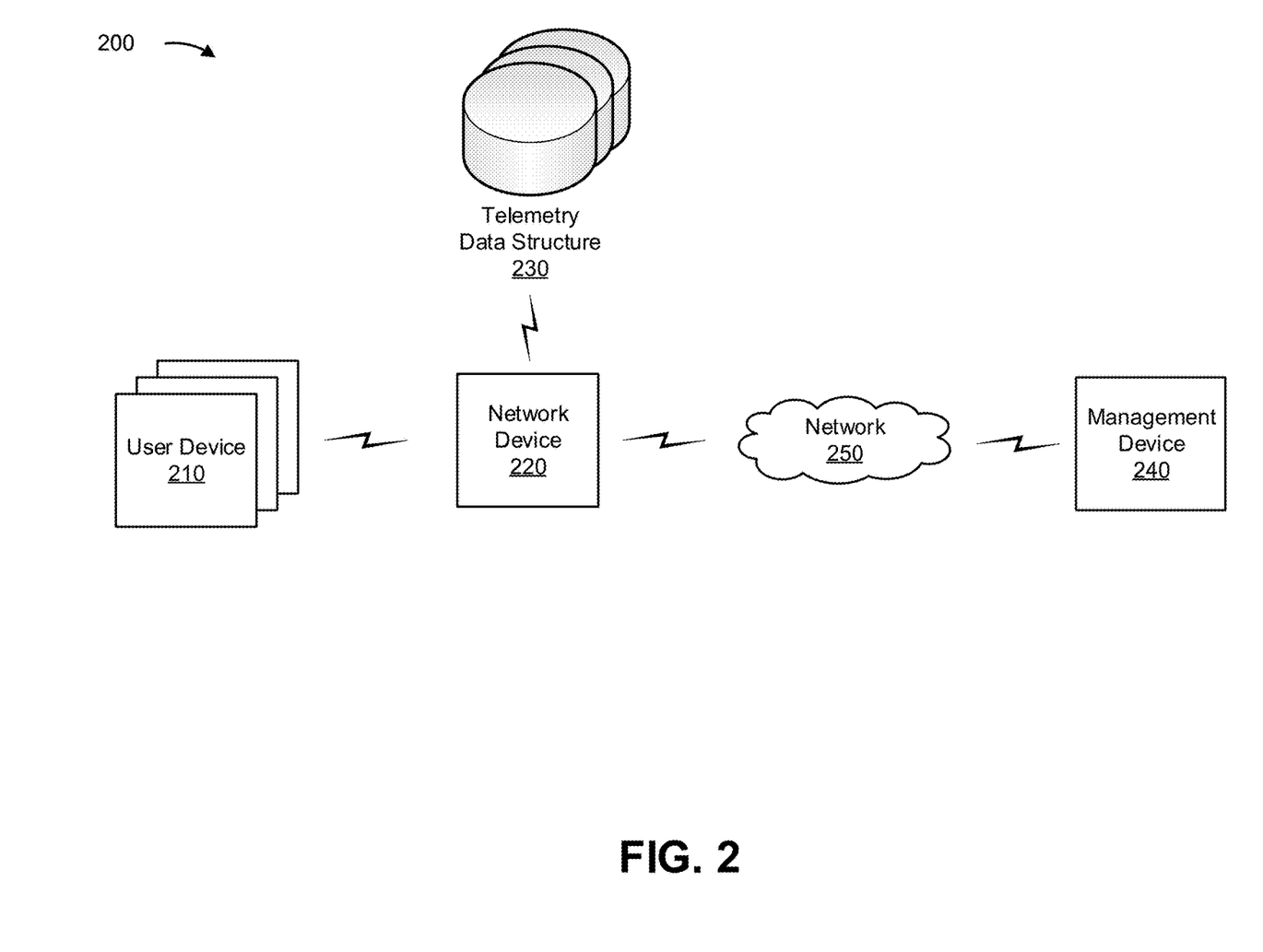
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more user devices 210 (referred to herein individually as user device 210, or collectively as user devices 210), a network device 220, one or more telemetry data structures 230 (referred to herein individually as telemetry data structure 230 or collectively as telemetry data structures 230), a management device 240, and a network 250. Devices of environment 200 may interconnect via wired connections, wireless connections, or a combination of wired and wireless connections.

User device 210 includes one or more devices capable of receiving, generating, storing, processing, and/or providing telemetry data as described herein. For example, user device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network device 220 includes one or more devices (e.g., one or more traffic transfer devices) capable of processing and/or transferring traffic between user device 210 and network 250. For example, network device 220 may include a firewall, a router, a gateway, a switch, a hub, a bridge, a reverse proxy, a server (e.g., a proxy server), a security device, an intrusion detection device, a load balancer, or a similar device. In some implementations, network device 220 may be a physical device implemented within a housing, such as a chassis. In some implementations, network device 220 may be a virtual device implemented by one or more computer devices of a cloud computing environment or a data center.

Telemetry data structure 230 includes one or more data structures that are configured to store telemetry data as described herein. For example, telemetry data structure 230 may include a list, a table, an index, a database, a graph, and/or the like. Telemetry data structure 230 may include a persistent memory and/or a read-only memory.

Management device 240 includes one or more devices capable of storing, processing, and/or routing information associated with monitoring telemetry data as described herein (e.g., by periodically retrieving event records from the telemetry data structure). In some implementations, management device 240 may include a communication interface that allows management device 240 to receive information from and/or transmit information to other devices in environment 200.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
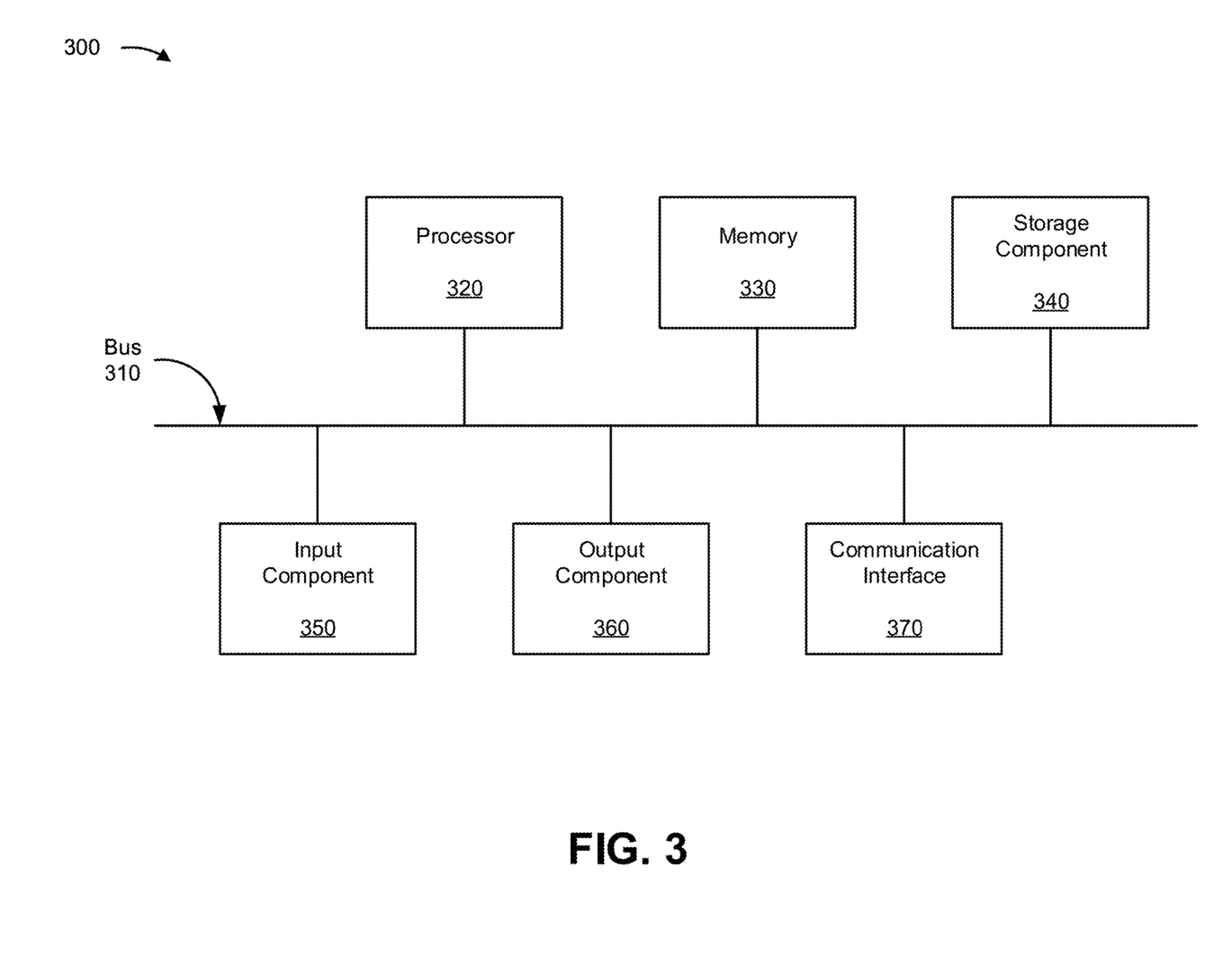
FIG. 3 is a diagram of example components of one or more devices of FIG. 2.

FIG. 3 is a diagram of example components of a device 300. Device 300 may correspond to user device 210, network device 220, telemetry data structure 230, and/or management device 240. In some implementations, user device 210, network device 220, telemetry data structure 230, and/or management device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
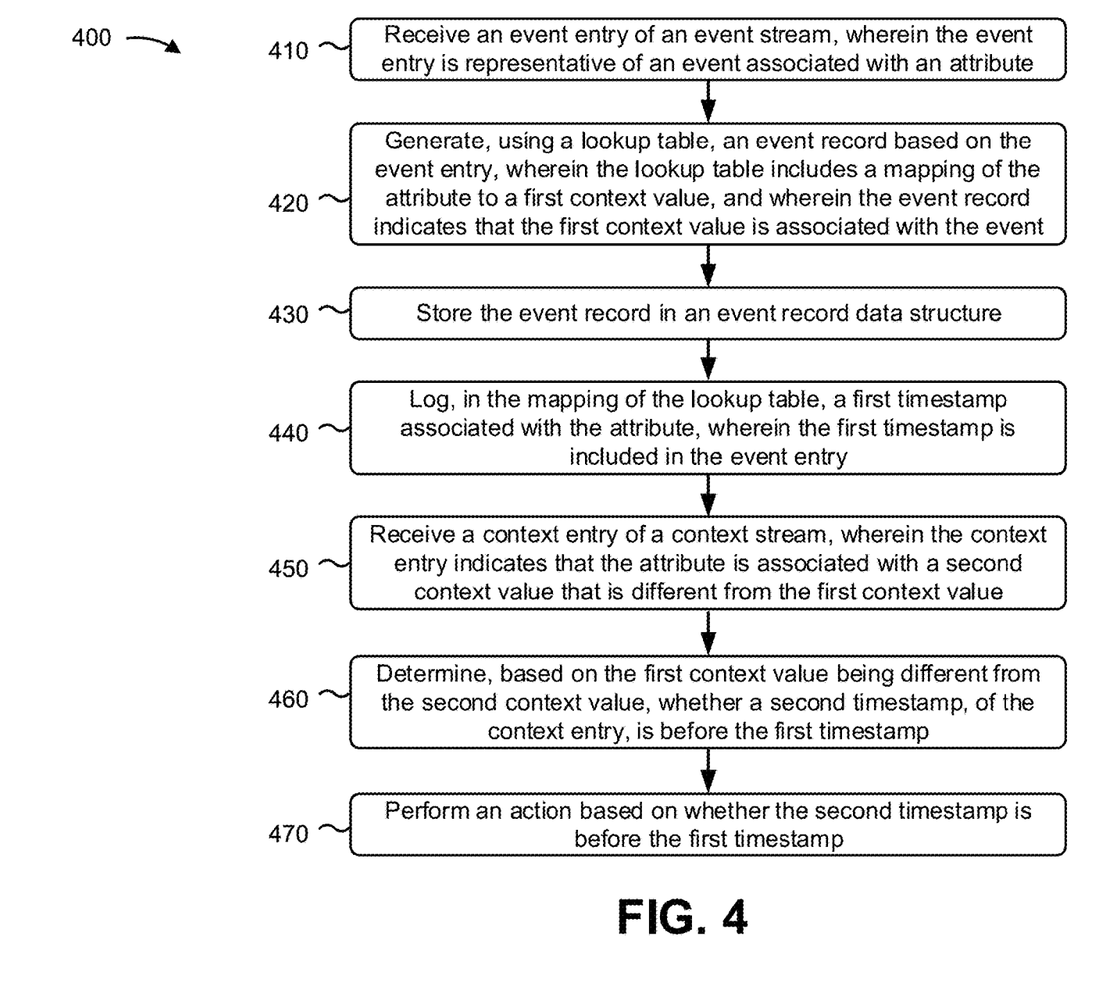
FIGS. 4-6 are flowcharts of one or more example processes for telemetry data error detection.

FIG. 4 is a flow chart of an example process 400 for telemetry data error detection. In some implementations, one or more process blocks of FIG. 4 may be performed by a network device (e.g., network device 220). In some implementations, one or more process blocks of FIG. 4 may be performed by another device or a group of devices separate from or including a network device, such as a user device (e.g., user device 210), a telemetry data structure (e.g., telemetry data structure 230), and a management device (e.g., management device 240).

As shown in FIG. 4, process 400 may include receiving an event entry of an event stream, wherein the event entry is representative of an event associated with an attribute (block 410). For example, the network device (e.g., using a processor 320, a memory 330, a storage component 340, an input component 350, and a communication interface 370, and/or the like) may receive an event entry of an event stream, as described above. In some implementations, the event entry is representative of an event associated with an attribute.

As further shown in FIG. 4, process 400 may include generating, using a lookup table, an event record based on the event entry, wherein the lookup table includes a mapping of the attribute to a first context value, and wherein the event record indicates that the first context value is associated with the event (block 420). For example, the network device (e.g., using a processor 320, a memory 330, a storage component 340, an input component 350, and a communication interface 370, and/or the like) may generate, using a lookup table, an event record based on the event entry, as described above. In some implementations, the lookup table includes a mapping of the attribute to a first context value. In some implementations, the event record indicates that the first context value is associated with the event.

As shown in FIG. 4, process 400 may include storing the event record in an event record data structure (block 430). For example, the network device (e.g., using a processor 320, a memory 330, a storage component 340, an input component 350, and a communication interface 370, and/or the like) may store the event record in an event record data structure, as described above.

As shown in FIG. 4, process 400 may include logging, in the mapping of the lookup table, a first timestamp associated with the attribute, wherein the first timestamp is included in the event entry (block 440). For example, the network device (e.g., using a processor 320, a memory 330, a storage component 340, an input component 350, and a communication interface 370, and/or the like) may log, in the mapping of the lookup table, a first timestamp associated with the attribute, as described above. In some implementations, the first timestamp is included in the event entry.

As shown in FIG. 4, process 400 may include receiving a context entry of a context stream, wherein the context entry indicates that the attribute is associated with a second context value that is different from the first context value (block 450). For example, the network device (e.g., using a processor 320, a memory 330, a storage component 340, an input component 350, and a communication interface 370, and/or the like) may receive a context entry of a context stream, as described above. In some implementations, the context entry indicates that the attribute is associated with a second context value that is different from the first context value.

As shown in FIG. 4, process 400 may include determining, based on the first context value being different from the second context value, whether a second timestamp, of the context entry, is before the first timestamp (block 460). For example, the network device (e.g., using a processor 320, a memory 330, a storage component 340, an input component 350, and a communication interface 370, and/or the like) may determining, based on the first context value being different from the second context value, whether a second timestamp, of the context entry, is before the first timestamp, as described above.

As shown in FIG. 4, process 400 may include performing an action based on whether the second timestamp is before the first timestamp (block 470). For example, the network device (e.g., using a processor 320, a memory 330, a storage component 340, an output component 360, and a communication interface 370, and/or the like) may perform an action based on whether the second timestamp is before the first timestamp, as described above.

Process 400 may include additional implementations, such as any single implementation or any combination of implementations described below and/or in connection with one or more other processes described elsewhere herein.

In some implementations, the first timestamp is representative of a most recent time that any event, associated with the attribute, occurred according to the event stream. In some implementations, the event entry is received from a first source and the context entry is received from a second source that is different from the first source.

In some implementations, the context entry is received after the event entry. In some implementations, the event stream and the context stream are associated with a same network. In some implementations, the attribute comprises an internet protocol address associated with the event.

In some implementations, when the second timestamp is determined to be before the first timestamp, the network device, when performing the action, may store an error record in an error record data structure. In some implementations, the error record identifies a time period between the first timestamp and the second timestamp to indicate that any context value that was associated with the attribute during the time period is likely inaccurate.

In some implementations, when the second timestamp is determined to be before the first timestamp, the network device, when performing the action, may append an error flag to the event record in the event record data structure to indicate that the first context value is likely inaccurate.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
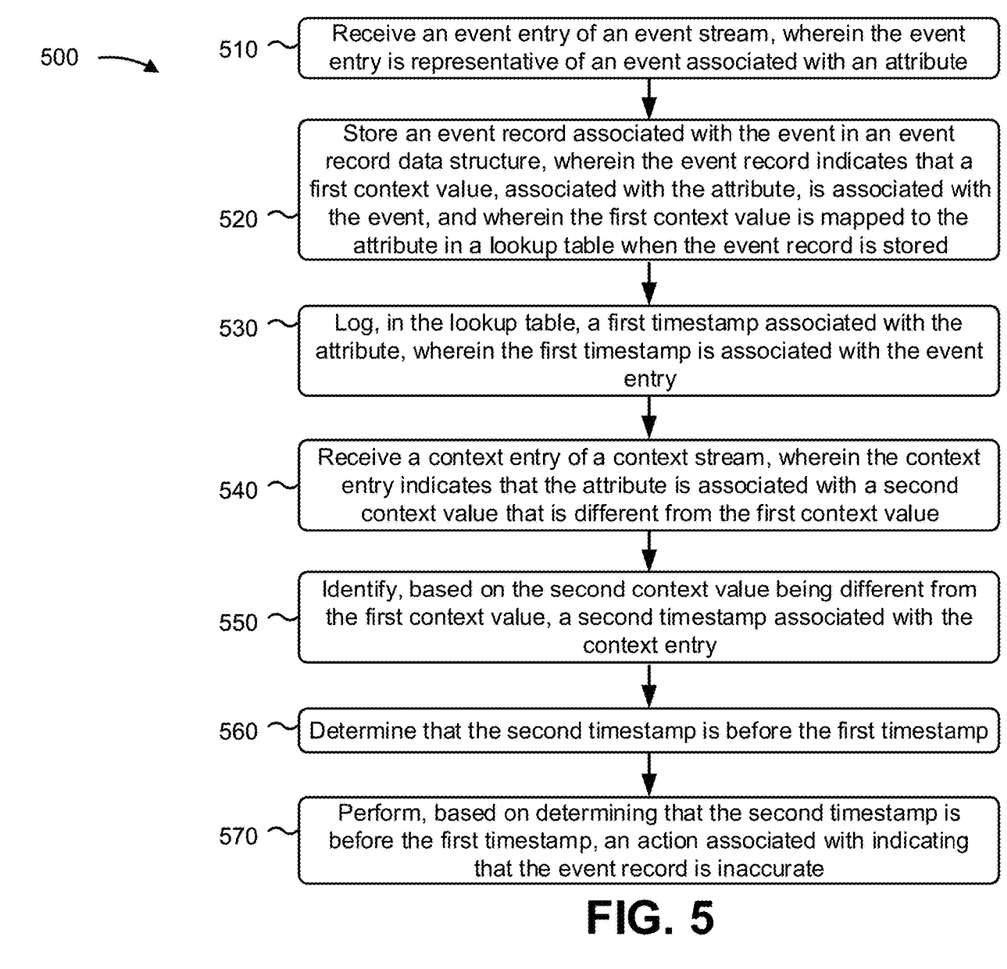

FIG. 5 is a flow chart of an example process 500 for telemetry data error detection. In some implementations, one or more process blocks of FIG. 5 may be performed by a network device (e.g., network device 220). In some implementations, one or more process blocks of FIG. 5 may be performed by another device or a group of devices separate from or including a network device, such as a user device (e.g., user device 210), a telemetry data structure (e.g., telemetry data structure 230), and a management device (e.g., management device 240).

As further shown in FIG. 5, process 500 may include receiving an event entry of an event stream, wherein the event entry is representative of an event associated with an attribute (block 510). For example, the network device (e.g., using a processor 320, a memory 330, a storage component 340, an input component 350, and a communication interface 370, and/or the like) may receive an event entry of an event stream, as described above. In some implementations, the event entry is representative of an event associated with an attribute.

As further shown in FIG. 5, process 500 may include storing an event record associated with the event in an event record data structure, wherein the event record indicates that a first context value, associated with the attribute, is associated with the event, and wherein the first context value is mapped to the attribute in a lookup table when the event record is stored (block 520). For example, the network device (e.g., using a processor 320, a memory 330, a storage component 340, an input component 350, and a communication interface 370, and/or the like) may store an event record associated with the event in an event record data structure, as described above. In some implementations, the event record indicates that a first context value, associated with the attribute, is associated with the event. In some implementations, wherein the first context value is mapped to the attribute in a lookup table when the event record is stored.

As further shown in FIG. 5, process 500 may include logging, in the lookup table, a first timestamp associated with the attribute, wherein the first timestamp is associated with the event entry (block 530). For example, the network device (e.g., using a processor 320, a memory 330, a storage component 340, an input component 350, and a communication interface 370, and/or the like) may log, in the lookup table, a first timestamp associated with the attribute, as described above. In some implementations, the first timestamp is associated with the event entry.

As further shown in FIG. 5, process 500 may include receiving a context entry of a context stream, wherein the context entry indicates that the attribute is associated with a second context value that is different from the first context value (block 540). For example, the network device (e.g., using a processor 320, a memory 330, a storage component 340, an input component 350, and a communication interface 370, and/or the like) may receive a context entry of a context stream, as described above. In some implementations, the context entry indicates that the attribute is associated with a second context value that is different from the first context value.

As further shown in FIG. 5, process 500 may include identifying, based on the second context value being different from the first context value, a second timestamp associated with the context entry (block 550). For example, the network device (e.g., using a processor 320, a memory 330, a storage component 340, an input component 350, and a communication interface 370, and/or the like) may identify, based on the second context value being different from the first context value, a second timestamp associated with the context entry, as described above.

As further shown in FIG. 5, process 500 may include determining that the second timestamp is before the first timestamp (block 560). For example, the network device (e.g., using a processor 320, a memory 330, a storage component 340, an input component 350, and a communication interface 370, and/or the like) may determine that the second timestamp is before the first timestamp, as described above.

As further shown in FIG. 5, process 500 may include performing, based on determining that the second timestamp is before the first timestamp, an action associated with indicating that the event record is inaccurate (block 570). For example, the network device (e.g., using a processor 320, a memory 330, a storage component 340, an input component 350, and a communication interface 370, and/or the like) may perform, based on determining that the second timestamp is before the first timestamp, an action associated with indicating that the event record is inaccurate, as described above.

Process 500 may include additional implementations, such as any single implementation or any combination of implementations described below and/or in connection with one or more other processes described elsewhere herein.

In some implementations, the event record is generated based on the first context value being mapped to the attribute in the lookup table. In some implementations, the attribute comprises an internet protocol address associated with the event. In some implementations, the first context value comprises a host identifier of a first user device. In some implementations, the second context value comprises a host identifier of a second user device that is different from the first user device.

In some implementations, the event entry and the context entry are associated with different user devices. In some implementations, the event entry is received from a first source before the context entry. In some implementations, the context entry is received from a second source that is different from the first source. In some implementations, the first source and the second source are associated with a same network.

In some implementations, the network device, when performing the action, may send a notification to a management device. In some implementations, the notification identifies that the event record data structure likely includes an inaccurate event record. In some implementations, the network device, when performing the action, may store an error record in an error record data structure that is separate from the event record data structure. In some implementations, the error record identifies a time period between the first timestamp and the second timestamp to indicate that any context value that was associated with the attribute during the time period is likely inaccurate. In some implementations, the network device, when performing the action, may append an error flag to the event record in the event record data structure to indicate that the context value of the event record is likely inaccurate.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
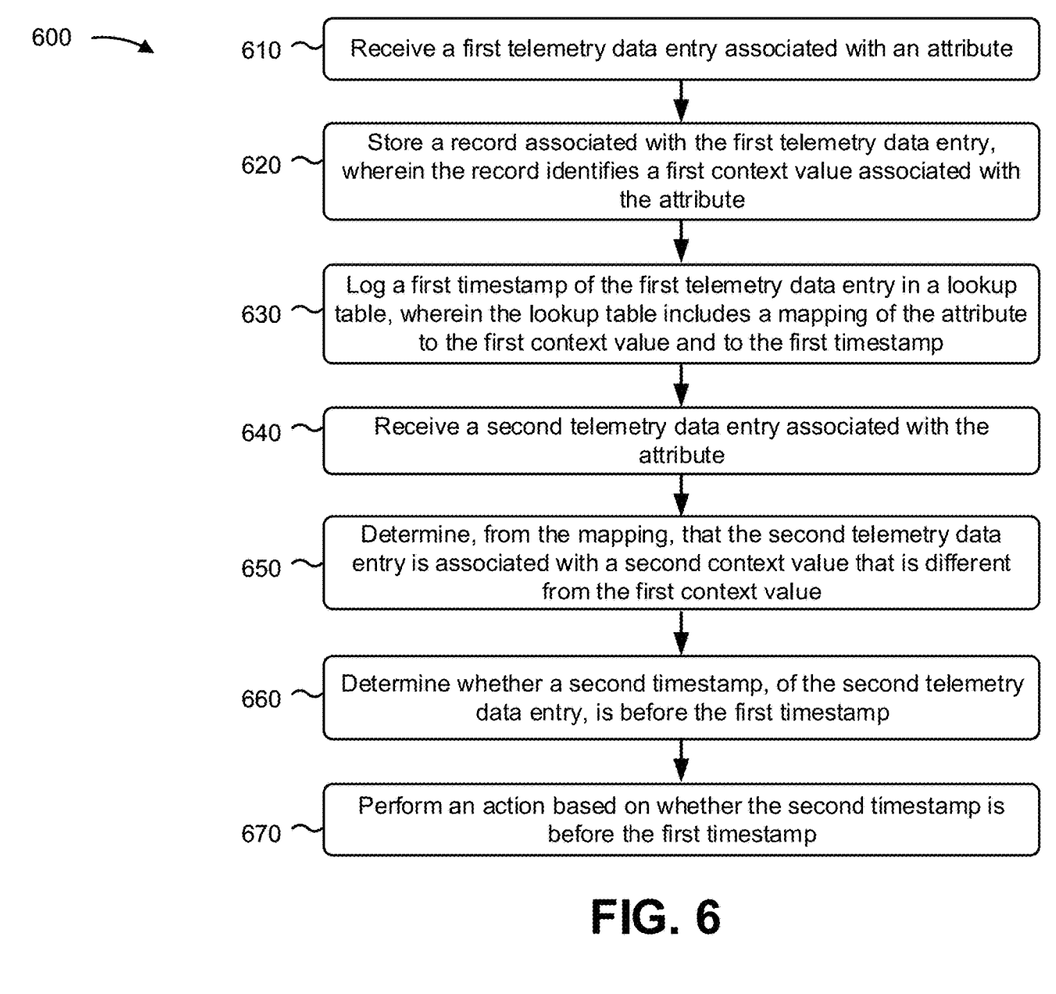

FIG. 6 is a flow chart of an example process 600 for telemetry data error detection. In some implementations, one or more process blocks of FIG. 6 may be performed by a network device (e.g., network device 220). In some implementations, one or more process blocks of FIG. 6 may be performed by another device or a group of devices separate from or including a network device, such as a user device (e.g., user device 210), a telemetry data structure (e.g., telemetry data structure 230), and a management device (e.g., management device 240).

As shown in FIG. 6, process 600 may include receiving a first telemetry data entry associated with an attribute (block 610). For example, the network device (e.g., using a processor 320, a memory 330, a storage component 340, an input component 350, and a communication interface 370, and/or the like) may receive a first telemetry data entry associated with an attribute, as described above.

As further shown in FIG. 6, process 600 may include storing a record associated with the first telemetry data entry, wherein the record identifies a first context value associated with the attribute (block 620). For example, the network device (e.g., using a processor 320, a memory 330, a storage component 340, an input component 350, and a communication interface 370, and/or the like) may store a record associated with the first telemetry data entry, as described above. In some implementations, the record identifies a first context value associated with the attribute.

As further shown in FIG. 6, process 600 may include logging a first timestamp of the first telemetry data entry in a lookup table, wherein the lookup table includes a mapping of the attribute to the first context value and to the first timestamp (block 630). For example, the network device (e.g., using a processor 320, a memory 330, a storage component 340, an input component 350, and a communication interface 370, and/or the like) may log a first timestamp of the first telemetry data entry in a lookup table, as described above. In some implementations, the lookup table includes a mapping of the attribute to the first context value and to the first timestamp.

As further shown in FIG. 6, process 600 may include receiving a second telemetry data entry associated with the attribute (block 640). For example, the network device (e.g., using a processor 320, a memory 330, a storage component 340, an input component 350, and a communication interface 370, and/or the like) may receive a second telemetry data entry associated with the attribute, as described above.

As further shown in FIG. 6, process 600 may include determining, from the mapping, that the second telemetry data entry is associated with a second context value that is different from the first context value (block 650). For example, the network device (e.g., using a processor 320, a memory 330, a storage component 340, an input component 350, and a communication interface 370, and/or the like) may determine, from the mapping, that the second telemetry data entry is associated with a second context value that is different from the first context value, as described above.

As further shown in FIG. 6, process 600 may include determining whether a second timestamp, of the second telemetry data entry, is before the first timestamp (block 660). For example, the network device (e.g., using a processor 320, a memory 330, a storage component 340, an input component 350, and a communication interface 370, and/or the like) may determine whether a second timestamp, of the second telemetry data entry, is before the first timestamp, as described above.

As further shown in FIG. 6, process 600 may include performing an action based on whether the second timestamp is before the first timestamp (block 670). For example, the network device (e.g., using a processor 320, a memory 330, a storage component 340, an output component 360, and a communication interface 370, and/or the like) may perform an action based on whether the second timestamp is before the first timestamp, as described above.

Process 600 may include additional implementations, such as any single implementation or any combination of implementations described below and/or in connection with one or more other processes described elsewhere herein.

In some implementations, the first telemetry data entry is associated with an event of a network and the second telemetry data entry is associated with an identification assignment of the network. In some implementations, the first telemetry data entry is received from a user device that is communicatively coupled to a network and the second telemetry data entry is received from a dynamic host configuration protocol server of the network.

In some implementations, when the second timestamp is determined to be before the first timestamp, the network device may send a notification to a management device. In some implementations, the notification identifies that the record is an inaccurate record.

In some implementations, when the second timestamp is determined to be before the first timestamp, the network device may store an error record in a data structure. In some implementations, the error record identifies a time period between the first timestamp and the second timestamp to indicate that any context value that was associated with the attribute during the time period is likely inaccurate.

In some implementations, when the second timestamp is determined to be before the first timestamp, the network device may append an error flag to the record to indicate that the record is likely inaccurate.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    storing, by a device and in a table, a first timestamp associated with an attribute related to an event entry of an event stream,
        wherein the table includes information mapping the attribute to a first context value;
    determining, by the device and based on comparing a context entry of a context stream with information associated with the attribute, that the context entry is associated with a second context value;
    determining, by the device and based on determining that the context entry is associated with the second context value, whether a second timestamp, associated with the context entry, is before the first timestamp; and
    generating, by the device and based on determining whether the second timestamp is before the first timestamp, an error record that identifies a time period, between the first timestamp and the second timestamp, indicating that one or more context values, including at least one of the first context value or the second context value, associated with the attribute during the time period are inaccurate.

2. The method of claim 1, wherein the event entry is received from a first source and the context entry is received from a second source.

3. The method of claim 1, wherein the event stream includes one or more first data entries associated with one or more events related to the attribute, and
    wherein the context stream includes one or more second data entries associated with one or more changes to context related to the attribute.

4. The method of claim 1, wherein the context entry is received at a different time than the event entry.

5. The method of claim 1, wherein the attribute comprises an Internet protocol address associated with the event entry, and
    wherein at least one of the first context value or the second context value comprises a host identifier of another device.

6. The method of claim 1, further comprising:
    appending, based on determining that the second timestamp is before the first timestamp, an error flag to an event record data structure, associated with the event entry, to indicate that the first context value is inaccurate.

7. The method of claim 1, further comprising:
    storing, based on determining that the second timestamp is before the first timestamp, an error record in an error record data structure,
        wherein the error record identifies the time period.

8. A device, comprising:
    one or more memories; and
    one or more processors, coupled to the one or more memories, to:
        store, in a table, a first timestamp associated with an attribute related to an event entry of an event stream,
            wherein the table includes information mapping the attribute to a first context value;
        determine, based on comparing a context entry of a context stream with information associated with the attribute, that the context entry is associated with a second context value;
        determine, based on determining that the context entry is associated with the second context value, whether a second timestamp, associated with the context entry, is before the first timestamp; and
        generate, based on determining whether the second timestamp is before the first timestamp, an error record that identifies a time period, between the first timestamp and the second timestamp, indicating that one or more context values, including at least one of the first context value or the second context value, associated with the attribute during the time period are inaccurate.

9. The device of claim 8, wherein the event entry is received from a first source and the context entry is received from a second source.

10. The device of claim 8, wherein the event stream includes one or more first data entries associated with one or more events related to the attribute, and
    wherein the context stream includes one or more second data entries associated with one or more changes to context related to the attribute.

11. The device of claim 8, wherein the context entry is received at a different time than the event entry.

12. The device of claim 8, wherein the attribute comprises an Internet protocol address associated with the event entry, and
    wherein at least one of the first context value or the second context value comprises a host identifier of another device.

13. The device of claim 8, wherein the one or more processors are further to:
    append, based on determining that the second timestamp is before the first timestamp, an error flag to an event record data structure, associated with the event entry, to indicate that the first context value is inaccurate.

14. The device of claim 8, wherein the one or more processors are further to:
    store, based on determining that the second timestamp is before the first timestamp, an error record in an error record data structure,
        wherein the error record identifies the time period.

15. A non-transitory computer-readable medium storing a set of instructions, the set of instructions comprising:
one or more instructions that, when executed by one or more processors of a device, cause the device to:
store, in a table, a first timestamp associated with an attribute related to an event entry of an event stream, wherein the table includes information mapping the attribute to a first context value;
determine, based on comparing a context entry of a context stream with information associated with the attribute, that the context entry is associated with a second context value;
determine, based on determining that the context entry is associated with the second context value, whether a second timestamp, associated with the context entry, is before the first timestamp; and
generate, based on determining whether the second timestamp is before the first timestamp, an error record that identifies a time period, between the first timestamp and the second timestamp, indicating that one or more context values, including at least one of the first context value or the second context value, associated with the attribute during the time period are inaccurate.

16. The non-transitory computer-readable medium of claim 15, wherein the event entry is received from a first source and the context entry is received from a second source.

17. The non-transitory computer-readable medium of claim 15, wherein the event stream includes one or more first data entries associated with one or more events related to the attribute, and
wherein the context stream includes one or more second data entries associated with one or more changes to context related to the attribute.

18. The non-transitory computer-readable medium of claim 15, wherein the context entry is received at a different time than the event entry.

19. The non-transitory computer-readable medium of claim 15, wherein the attribute comprises an Internet protocol address associated with the event entry, and
wherein at least one of the first context value or the second context value comprises a host identifier of another device.

20. The non-transitory computer-readable medium of claim 15, wherein the one or more instructions further cause the device to:
append, based on determining that the second timestamp is before the first timestamp, an error flag to an event record data structure, associated with the event entry, to indicate that the first context value is inaccurate.

* * * * *